United States Patent [19]

Abiru et al.

[11] Patent Number: 5,168,967
[45] Date of Patent: Dec. 8, 1992

[54] DYNAMIC DAMPER AND METHOD FOR DETECTING MALFUNCTION OF DYNAMIC DAMPER

[75] Inventors: Hisanori Abiru; Hideaki Harada; Kazumi Tamura; Manabu Fujishiro; Jun Hirai, all of Kanonshin, Japan

[73] Assignee: Mitsubishi Jukogyo Kabushiki Kaisha, Tokyo, Japan

[21] Appl. No.: 591,554

[22] Filed: Oct. 1, 1990

[30] Foreign Application Priority Data

| Oct. 18, 1989 [JP] | Japan | 1-269019 |
| Oct. 19, 1989 [JP] | Japan | 1-270203 |
| Feb. 19, 1990 [JP] | Japan | 2-37800 |
| Apr. 23, 1990 [JP] | Japan | 2-105380 |

[51] Int. Cl.⁵ .................................. F16F 7/00
[52] U.S. Cl. .................... 188/378; 52/167 R; 52/346; 248/560
[58] Field of Search ............... 188/378, 381; 267/160; 52/167 R, 346, 573; 248/560, 561, 566, 573, 581

[56] References Cited

U.S. PATENT DOCUMENTS 4,483,425  11/1984  Newman ........................... 188/378

FOREIGN PATENT DOCUMENTS 1059323  12/1983  U.S.S.R. ........................... 188/378
2224097   4/1990  United Kingdom ............. 52/167 R Primary Examiner—Matthew C. Graham
Attorney, Agent, or Firm—McGlew and Tuttle

[57] ABSTRACT

Disclosed is a dynamic damper which is to absorb building vibrations in any horizontal directions, not restricted to one direction. For example, it comprises an oscillating body which is held to move horizontally, a plurality of ball screws which are arranged perpendicularly to each other with a height difference among them and which have a nut portion on the side of the oscillating body and a screw shaft engaging with said nut portion, and motors which reciprocate the oscillating body according to the period of vibration of the building by turning the ball screws.

3 Claims, 11 Drawing Sheets

DYNAMIC DAMPER AND METHOD FOR DETECTING MALFUNCTION OF DYNAMIC DAMPER

FIELD OF THE INVENTION

The present invention relates to a dynamic damper for reducing the vibrations of buildings or structures or the like.

Conventional dynamic dampers are disposed in a building or the like and have an oscillating body driven for reducing the oscillations and vibrations of the building where this damper is placed. Dynamic dampers have been known in which an oscillating body 1 is supported by wheels 42 on rails 41 and driven to reciprocate using a cylinder type shaker 43 as shown in FIG. 9. Also shown are dampers in which the rotation of a motor 44 is transformed into reciprocating linear motion using a rack 45a and a pinion 45b as shown in FIG. 10.

Furthermore, as shown in FIG. 15, a conventional pendulum type dynamic damper is characterized in that a oscillating body 63 is suspended from an outer frame 61 by way of a plurality of cables or wires 66, and shock absorbers 64 as damping elements are disposed horizontally between two sides of the oscillating body 63 and the outer frame 61.

The above-mentioned conventional dynamic dampers have the following problems.

In order to reduce vibrations in all horizontal directions, the oscillating body has to be driven in two directions. The vibration reduction effect of the conventional dynamic damper, however, is restricted to the direction of the rail and the rack used, i.e., to a single direction.

In the conventional damper, such as the one shown in FIG. 15, the damping elements are attached to the side of the oscillating body whose amplitude of oscillation is large. Because its required space has to include the size of the oscillating body, its amplitude of oscillation, the length of the damping elements, and its stroke, a large space is required for the disposition of the damping system. In addition, the stroke of the damping elements has to be large.

Also, the conventional pendulum type damper has a frequency which is determined by the suspension length of the wires. If the natural frequency of a building is very much different in two perpendicular directions, it has been difficult to adapt the conventional damper to such a building.

Although there exist inverted pendulum type dynamic dampers in order to solve this problem, because the trajectory of motion of the oscillating body is an arc, it has been difficult to control the motion of the oscillating body in a horizontal plane, for example, in the case of adapting it to an active dynamic damper.

OBJECT AND SUMMARY OF THE INVENTION

An object of the present invention is to provide a dynamic damper which can cope with building vibrations in any horizontal direction and which solves the above problems associated with the conventional dynamic dampers.

The present invention provides a dynamic damper which comprises an oscillating body which is held to move horizontally with respect to a building whose vibration is to be reduced. A plurality of ball screws are arranged perpendicularly to each other with a height difference among them and have a nut portion on the side of the oscillating body and a screw shaft engaging with the nut portion on the side of the building. Motors reciprocate the oscillating body according to the period of vibration of the building by turning the ball screws.

The reciprocating motion of the oscillating body and the vibration of a building can be synchronized because the nuts of the ball screws are disposed on the side of the oscillating body which is held so as to move horizontally with respect to the building. Screw shafts and a motor are disposed in the building side so that the ball screws turn and the oscillating body reciprocates in keeping with the vibrational period of the building. By shifting the phase between the vibration of the building and the reciprocating motion of the oscillating body, the vibration of the building is reduced. Vibrations in any direction within the plane can be reduced because a plurality of the ball screws are arranged in perpendicular directions.

The present invention also provides a dynamic damper which comprises an oscillating body which is held so as to move horizontally with respect to a building whose vibration is to be reduced, ball screws which are arranged horizontally under the oscillating body and whose screw shafts are fixed at their ends to the building and whose nuts are supported by the oscillating body so that the nuts can be rotated by a motor and so as to restrict the nuts' motion in their axial direction, and another set of ball screws which are arranged horizontally so that the two sets of ball screws are arranged perpendicularly as viewed from top and whose screw shafts are supported by the building so that the shafts can be rotated by a motor and whose nuts are supported by the oscillating body so as to restrict the nuts' rotation and motion in their axial direction with respect to the oscillating body.

To the oscillating body which is held by a building so that it can move horizontally, the ball screws are arranged horizontally in two perpendicular directions. The nuts are supported so that their motion is restricted in their axial direction with respect to the oscillating body. The screw shafts of one set of the ball screws are fixed to the building and their nuts are held so as to be rotated by a motor. The screw shafts of the other set of ball screws are fixed to the building so that the screw shafts are rotated by a motor. When the motors turn in correspondence with the vibration of the building the oscillating body makes a reciprocating movement similar to the vibration of the building. By synchronizing the motion of the oscillating body with a phase shift of a half period, the vibrational energy of the building and the kinetic energy of the oscillating body cancel each other out, and the vibration of the building is reduced drastically.

Furthermore, the present invention provides another dynamic damper which comprises a oscillating body which is suspended from an outer frame, a rod for connecting the oscillating body and the upper portion of the outer frame without restricting the motion of the oscillating body and without supporting the weight of the oscillating body, and springs and damping elements which are disposed more or less horizontally between the outer frame and the rod.

According to this dynamic damper of the present invention, the oscillating body, which is suspended from the outer frame, is connected to an upper frame of the outer frame by way of the rod without the rod's supporting the weight of the oscillating body and without restricting the motion of the oscillating body. Thus damping effects are achieved because of the damping elements and the springs connecting the oscillating body and the rod to the outer frame.

Because the springs and the damping elements are disposed between the rod and the outer frame, the required area (or the occupied space) can be reduced compared to the case in which the damping elements are disposed between the side walls of the oscillating body and the outer frame as in the conventional dynamic damper described above. Also, the stroke of the damping elements etc. can be smaller compared to the conventional dynamic damper, in which the damping elements are attached to the sides of the oscillating body, and in which the operation of the damping elements is directly linked with the motion of the oscillating body with respect to the outer frame. Thus the designing and manufacture become easier.

In addition, because the springs are used as well as the damping elements, it is possible to adapt the dynamic damper to buildings with different natural frequencies by changing the stiffness of the springs.

Further, the oscillating body does not show rotational motion unlike an inverted pendulum type dynamic damper, and its oscillational motion can be close to being linear. This makes it easier to control the motion of the oscillating body in a horizontal plane using, for example, active damping.

According to this method of the present invention, it can be judged whether the dynamic damper is functioning to reduce the vibration of the object building or it is rather increasing the vibration of the object building due to disorders in computers or the like.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1a is a sectional view and FIG. 1b is a sectional plan view, viewed as indicated by the arrows b—b in FIG. 1a;

FIG. 2 shows a second embodiment of the present invention in correspondence with FIG. 1a;

FIGS. 3a and 3b shows a third embodiment of the present invention which corresponds to FIG. 1a; FIG. 3b is a sectional plan view, viewed as indicated by the arrows b—b in FIG. 3a;

FIG. 4 shows a fourth embodiment of the present invention in correspondence with FIG. 1a;

FIG. 7 shows a seventh embodiment of the present invention in correspondence with FIG. 3a;

FIG. 8a is its sectional view, and FIG. 8b is its lower plan view;

FIG. 13 shows the amplitudes and strokes of the oscillating body and the shock absorbers and the like;

DETAILED DESCRIPTION OF PREFERRED EMBODIMENTS

Figure 1A:
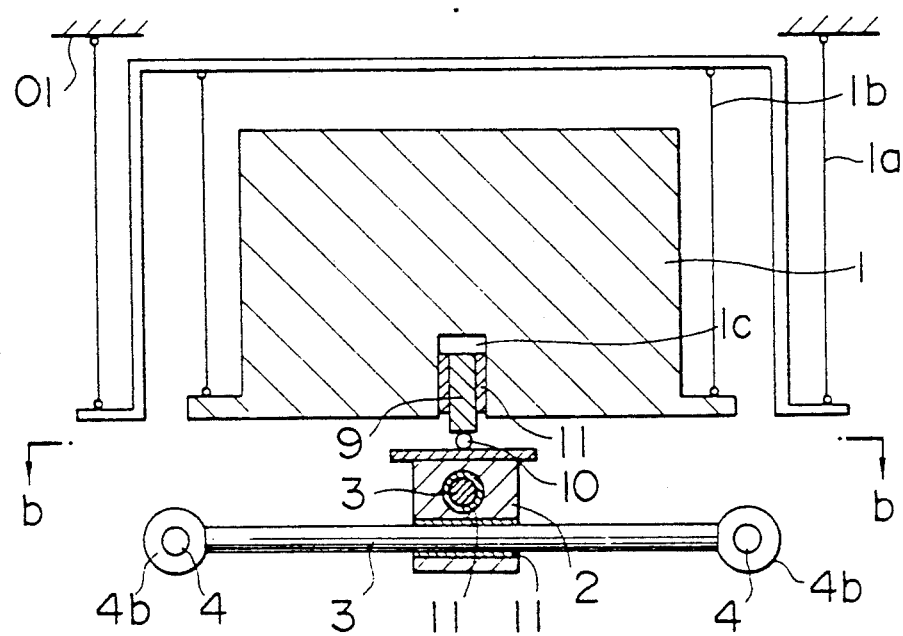
FIGS. 1a and 1b show a first embodiment of the present invention.

Referring to FIG. 1, a first embodiment of the present invention will be explained.

In this drawing, oscillating body 1 is suspended from a building 01 by cables 1a and 1b in the manner of a multistage pendulum. A hole is bored on the bottom of the oscillating body 1; and a vertical sliding member 9 is placed in the bored hole 1c. The bored hole 1c may also penetrate the oscillating body 1, if desired. A material with small friction coefficients or a slide shoe 11 is disposed as a slide mechanism between the oscillating body 1 and the sliding jig 9. The lower end of the sliding jig 9 is connected to a slider 2 through a universal joint or a ball joint 10. Beams 3 penetrate the slider 2 with an offset in the vertical direction so as to avoid each other and are arranged perpendicularly in a horizontal plane (as viewed from top). Material with small friction coefficients or a slide shoe 11 is also disposed at the sliding portions between the slider 2 and the beams 3. Nuts 4b of the ball screws 4 are attached to both ends of each beam 3, and the screw shafts 4a of the ball screws penetrate through and engage with the nuts. The screw shafts 4a of the ball screws 4 are supported by a side of the building through bearings 5. Gears 7 are disposed at one end of the screw shafts 4a and are in engagement with gears 7 disposed on a connection shaft 8. The connection shaft 8 is directly connected to a motor 6 so as to rotate.

When the connection shaft 8 is driven by the motor 6 following instructions from a computer or a control device (not shown), the ball screws 4 are turned through the gears 7, and the nuts 4b in engagement with the ball screws 4 move in the direction of the ball screw 4. At the same time, the beam 3 attached to the nuts 4b moves the slider 2, and in turn the slider 2 moves the oscillating body 1 through the universal or ball joint 10 and the sliding jig 9. This movement of the oscillating body is controlled to agree with the period of the building vibration with a phase shift of a half period. As a result, the energy of the reciprocating motion of the oscillating body cancels out the vibrational energy of the building and thus reduces the building vibration. In this embodiment of the present invention, because it is suspended as a multistage pendulum, the oscillating body 1 moves up and down slightly as it moves in horizontal directions. Such vertical (up and down) motion is absorbed by the vertical sliding of the sliding jig 9. Also, manufacturing errors of the multistage pendulum or the like may cause the rotational motion of the oscillating body 1 as it moves horizontally. This rotation can be absorbed by the universal or ball joint 10 at the lower end of the sliding jig 9.

Also, the drive in the two perpendicular directions has the same effects in all directions within the plane and functions in the same way because the slider 2 and the beams 3 slide in the respectable perpendicular directions.

Figure 2:
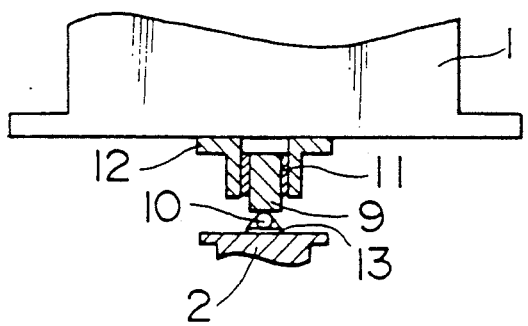

FIG. 2 shows a second embodiment of the present invention in which the sliding jig 9 in FIG. 1(a) is attached to the bottom side of the oscillating body 1. The sliding jig 9 is attached to the oscillating body 1 with a material having small friction coefficients or a slide shoe 11 and a cylindrical metal piece 12 to hold it. In this embodiment, the slider 2 is connected to the universal or ball joint 10 at the lower end of the sliding jig 9 through a safety device 13 which breaks under certain load. When abnormal loading occurs due to malfunction or some disorders, the oscillating body 1 is cut off from the slider 2, so that the driving system is protected. This safety device 13 can also be placed between the metal piece 12 and the oscillating body 1. According to this embodiment, the bored hole 1c shown in FIG. 1(a) is not necessary, and the manufacturing therefore becomes advantageously simpler.

Figure 3A:
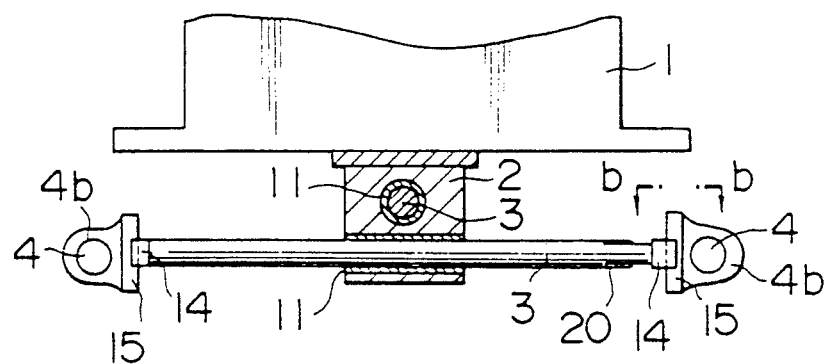
Figure 3B:
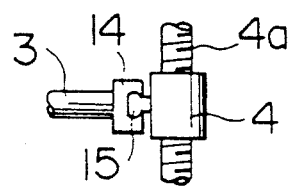

FIG. 3 shows a third embodiment of the present invention in which the oscillating body 1 in FIG. 1(a) is directly connected to the slider 2, and the vertical (up and down) motion and the inclination of the oscillating body 1 can be absorbed by vertical sliding mechanisms disposed between the ends of beams 3 and the nut portion 4b of the ball screws 4. Numeral 14 indicates a slide guide which is a part of the sliding mechanism, and numeral 15 indicates a rail in the sliding mechanism. Numeral 20 indicates a slide for absorbing variations in the length of the beam 3 which occur when the beam 3 inclines along with the inclination of the oscillating body 1. A plurality of the slide guides 14 and the rails 15 can also be disposed at each end of the beam 3.

Figure 4:
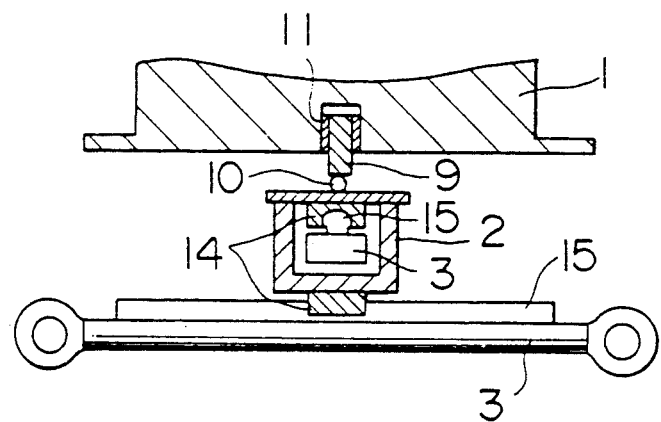

FIG. 4 shows a fourth embodiment of the present invention in which the slider 2 does not slide directly around the beams 3 as in FIG. 1a. Instead a slide guide 14 attached to the slider 2 slides on a rail 15 attached to the beam 3. In this embodiment, because the beam 3 does not penetrate the slider 2 and is on the outside of the slider 2, the beam 3 can be made larger in the case where large driving forces are required. Also, a plurality of slide guides 14 and rails 15 can be attached for each driving direction.

Figure 1B:
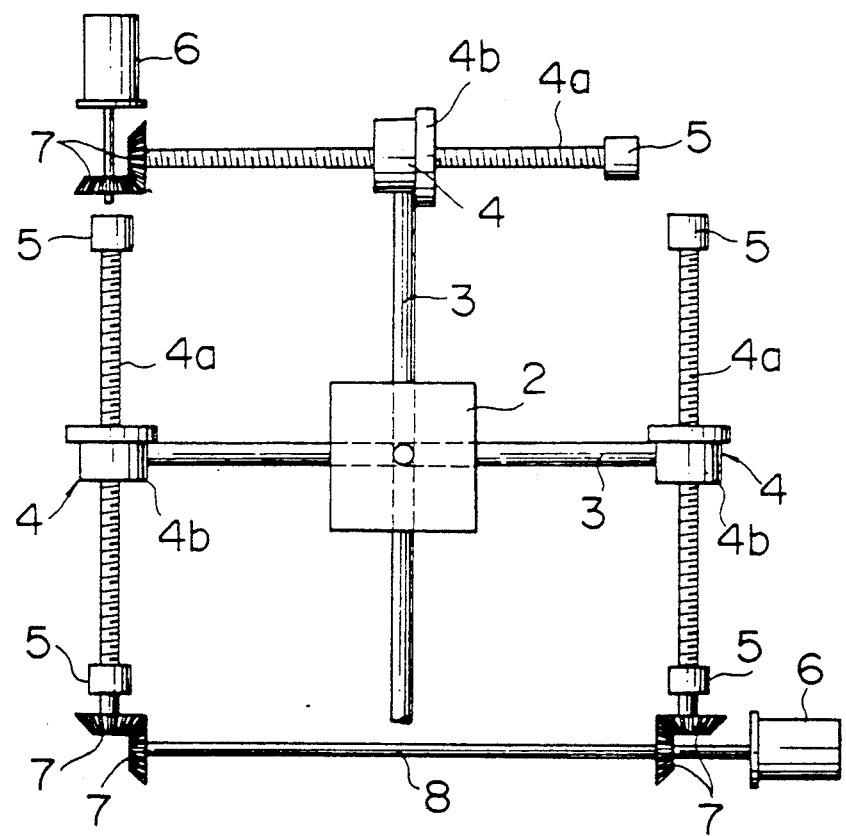
Figure 5:
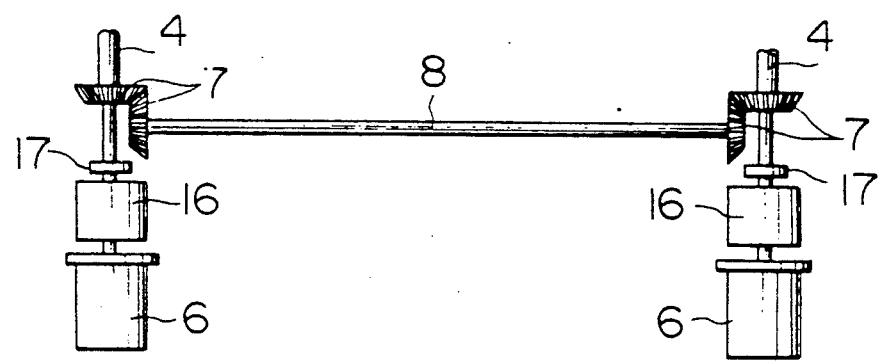
FIG. 5 shows a fifth embodiment of the present invention in correspondnece with to FIG. 1b.

FIG. 5 shows a fifth embodiment of the present invention in which two motors 6 are used to drive the ball screws 4 in FIG. 1(b) for each direction. In this embodiment, the motors 6 drive the ball screw 4 through a speed increasing (or reducing) device 16 and through a torque limiter 17 which slips with excessive torques for protecting the driving system. Also, the connection shaft 8 can be eliminated if the ball screws 4 on the two sides are synchronized sufficiently with each other. Furthermore, the number of the motors 6 can also be increased further for a plurality of motors to drive one ball screw 4.

Figure 6:
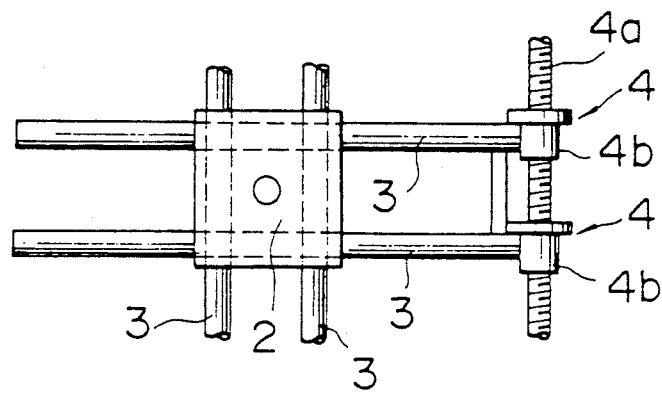
FIG. 6 shows a sixth embodiment of the present invention in correspondence with FIG. 1b.

FIG. 6 shows a sixth embodiment of the present invention in which two sets of the nuts are disposed at only one end of the beams for each driving direction instead of disposing one set on each end of the beam 3 as in FIG. 1(b). According to this embodiment, the number of the screw shafts can be reduced.

Figure 7:
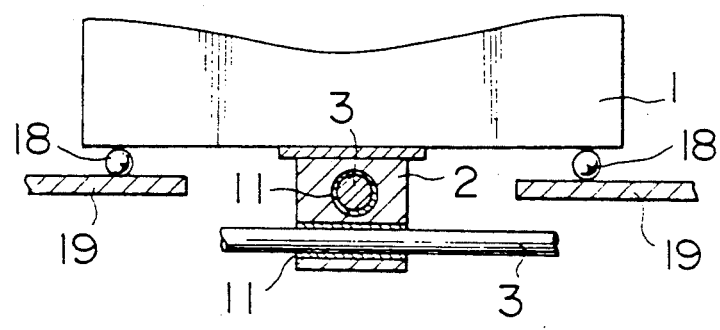

FIG. 7 shows a seventh embodiment of the present invention in which, instead of being suspended in the manner of a multistage pendulum, the oscillating body 1 in FIG. 3a is placed on a base 19 fixed to a building by way of balls 18 so that the body can reciprocate in any direction in a horizontal plane. According to this embodiment, the construction can be advantageously simpler.

We have described the seven embodiments in which the oscillating body 1 is suspended by cables 1a and 1b as a multistage pendulum, or it is placed on the balls 18. The method of holding the oscillating body 1, however, is by no means restricted to the above two examples of suspension. Any means which does not go against the objects of the present invention can be used as well.

As we have seen above, according to the first to seventh embodiments of the present invention, that the oscillating body 1 can be driven in a reciprocating manner so as to correspond to the vibration of the building in any horizontal direction. By synchronizing the motion of the oscillating body with the building vibration and with a suitable phase shift, the vibrational energy of the building can be cancelled by the input energy, so that building vibrations can advantageously be reduced.

Figure 8A:
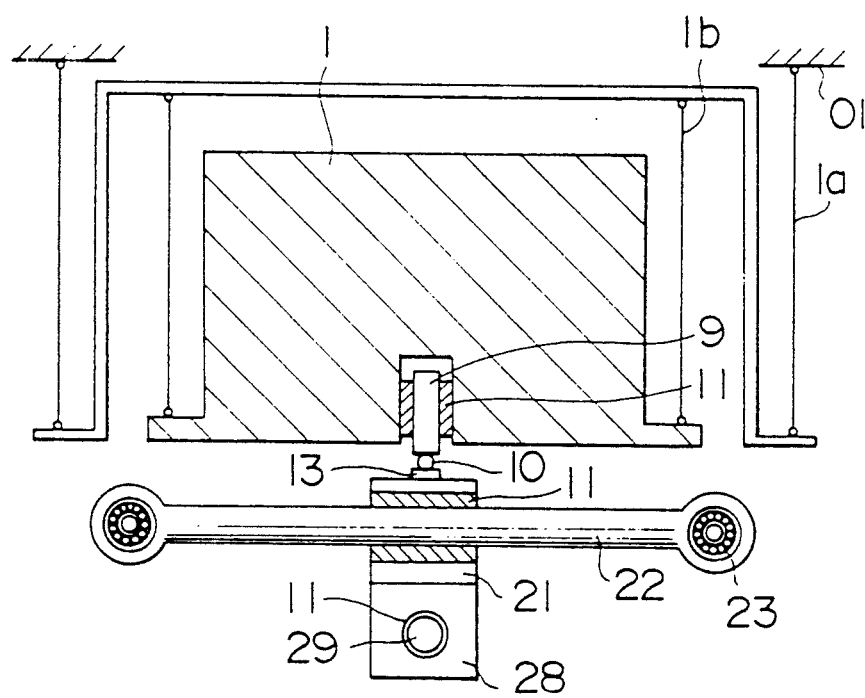
FIGS. 8a and 8b shows an eighth embodiment of the present invention.
Figure 8B:
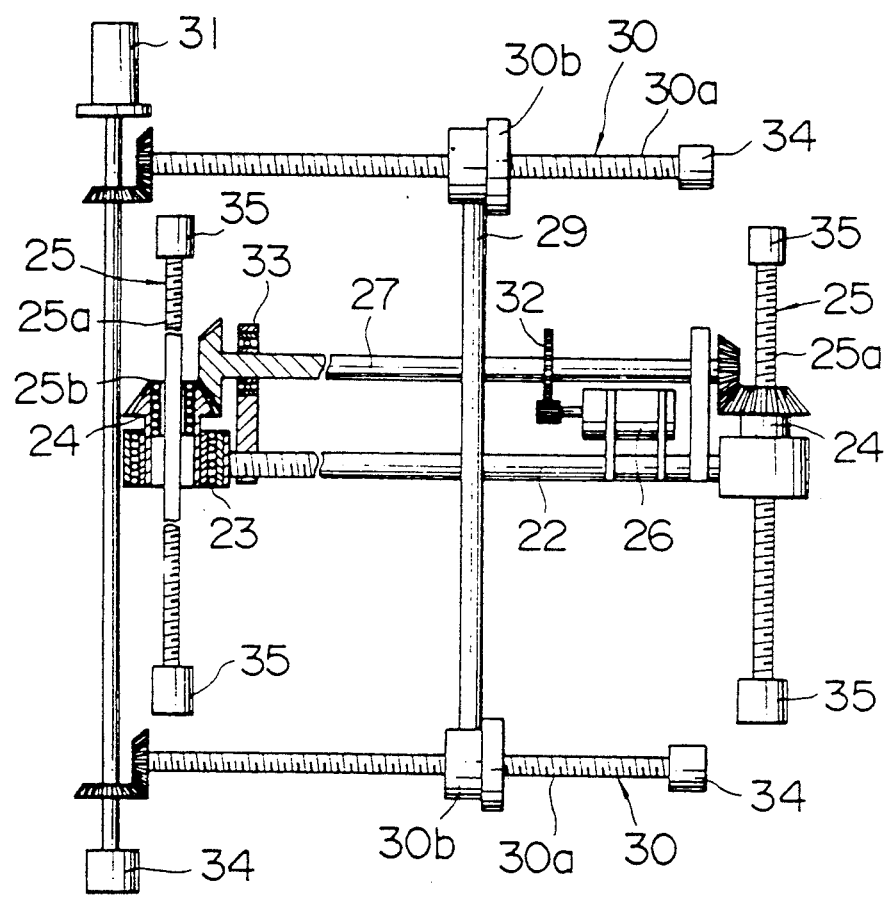
Figure 9:
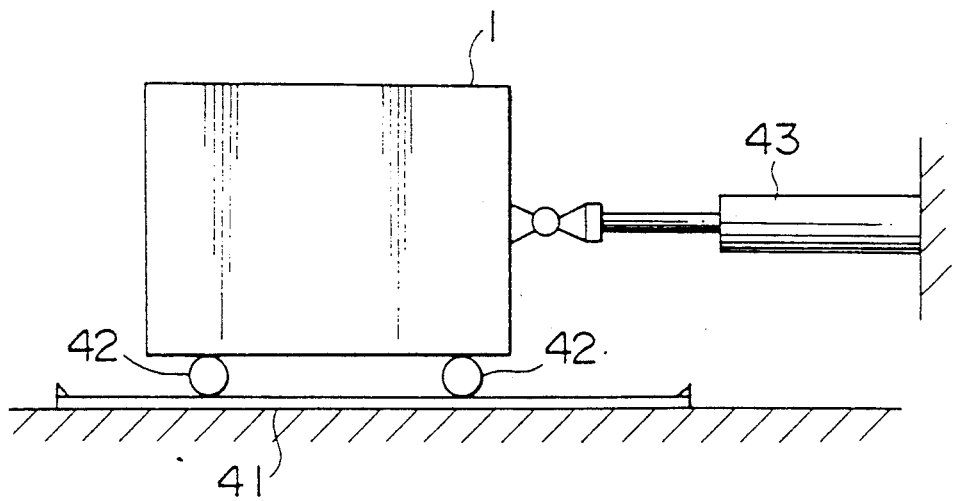
FIG. 9 shows a side view of a conventional example.
Figure 10:
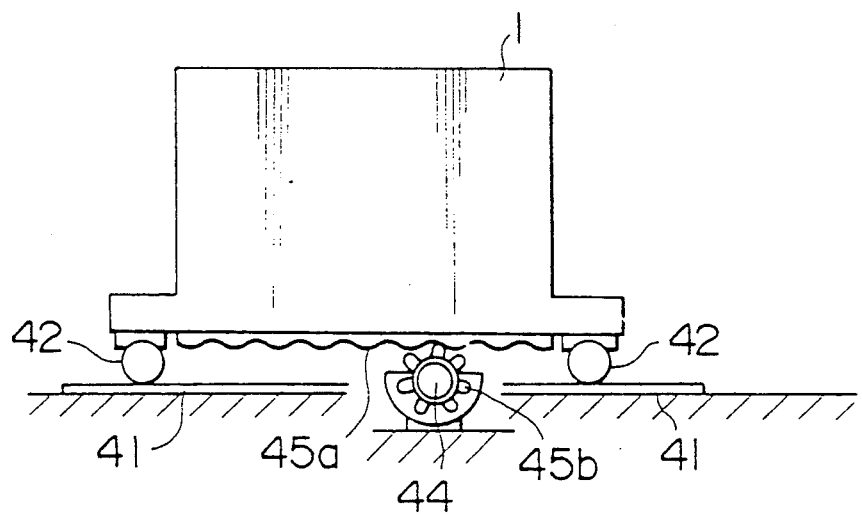
FIG. 10 shows a side view of another conventional example.
Figure 11:
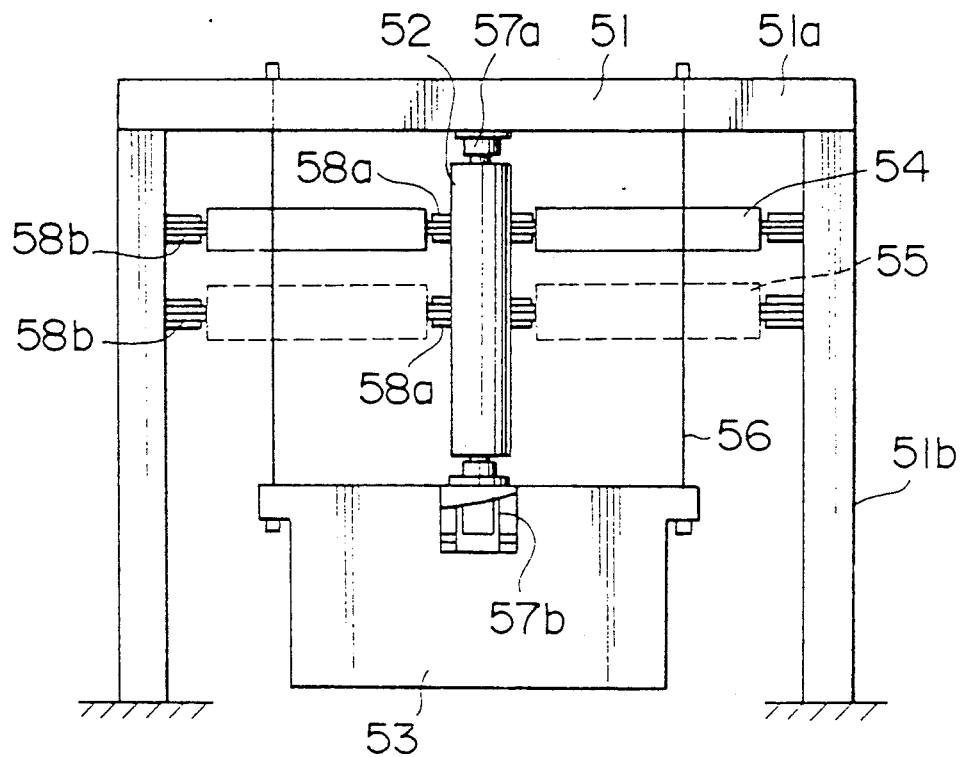
FIG. 11 shows a ninth embodiment of the dynamic damper of the present invention.
Figure 12:
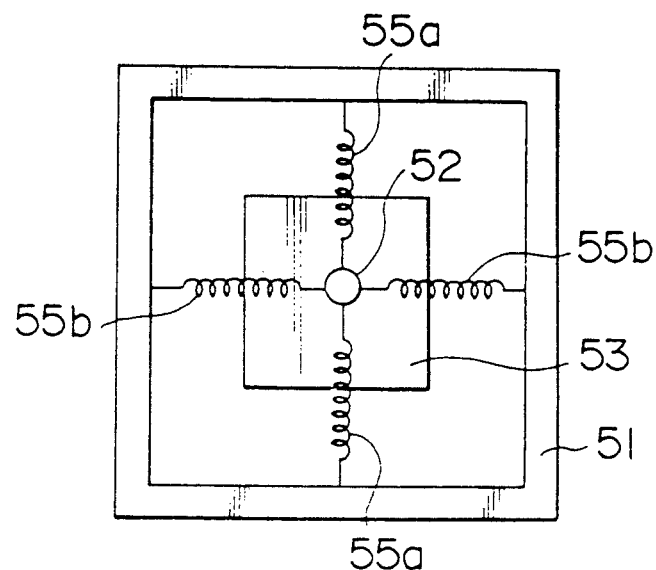
FIG. 12 shows a plan view of this embodiment.

An eighth embodiment of the present invention will now be explained, referring to FIG. 8. In FIG. 8a is a vertical sectional view of the eighth embodiment of the present invention, and FIG. 8b is a lower plan view of FIG. 8a.

In FIG. 8, the oscillating body 1, which is suspended as a multistage pendulum by cables 1a and 1b from a building 01, makes large amplitude reciprocating motions in horizontal directions, and it also moves slightly in the vertical direction. Thus a slide shoe 11 is disposed between the oscillating body 1 and a sliding jig 9 for a slider 21 which will be explained below, so that the sliding jig 9 can move vertically, allowing for the vertical motion of the oscillating body 1. Also, a safety device 13 is attached to the sliding jig 9 through a universal joint or a ball joint 10, so that the oscillating body can be cut off from the driving system in response to abnormal loading which occurs when the oscillating body makes abnormal motion due to malfunction or some other disorders. It is through this safety device 13 that a slider 21 for movable connection to ball screws 25 etc. described below is attached.

A slide bar 22 penetrates the slider 21, and a slide shoe is provided in between so that the slide bar 22 can slide smoothly. A ball bearing 23 is provided in the hole at each end of the slide bar 22, and a bush 24 whose one end is a bevel gear is inserted into the inner ring of each ball bearing 23. A nut 25b of the ball screw 25 is inserted inside the bush 24. This nut 25b is penetrated by and in engagement with the screw shaft 25a of the ball screw 25 whose ends are fixed to the building 01 through support bases 35. The bevel gear of the bush 24 is driven to rotate by a gear shaft 27 which is in turn driven by a mechanism including a pinion gear 32 which is powered by a motor 26 attached to the slide bar 22 within the same horizontal plane. Thus the nut 25b rotates together with the bush 24, and the oscillating body 1 moves in the vertical (up and down) direction in FIG. 8(b). The gear shaft 27 is supported by gear shaft bearings 33.

Another slider 28 is provided under the slider 21 as shown in FIG. 8a. This slider 28 is provided for moving the oscillating body 1 in the direction perpendicular with respect to the slider 21. A slide bar 29 is inserted through the slider 28 with a slide shoe 11 between the slide bar 29 and the slider 28. The nut 30b of the ball screw 30 is fixed to each end of the slide bar 29. This nut 30b is penetrated by and in engagement with the screw shaft 30a of the ball screws 30 which are supported by the building 01 by way of a bearing 34. The screw shafts 30a are driven to rotate by a motor 31 which is fixed to the building 01 by some suitable means. As a result, the nut 30b moves with the slide bar 29 and moves the oscillating body 1 in the left and right direction in FIG. 8(b).

In regard to the ball screw 25, the nut 25b rotates with respect to the screw shaft 25a which is fixed. In regard to the ball screw 30, as the screw shaft 30a rotates with respect to the nut 30b. Thus the oscillating body 1 moves in any direction which is in the vertical or the horizontal direction or an arbitrary combination of the vertical and horizontal directions of FIG. 8(b).

By adjusting this direction of motion to the direction of vibration of the building 01, and by controlling the speed and the rotational direction of the motors 26, 31 using a control device (not shown) so that the period of motion of the oscillating body coincides with the period of building vibration with a phase shift of a half period, the vibrational energy of the building 01 is cancelled out by the kinetic energy of the oscillating body 1. This reduces the vibration of the building 01. Also, the vertical displacements associated with the reciprocating motion (or pendulum motion) of the oscillating body 1 are absorbed by the sliding jig 9 and the slide shoe 11 as explained above.

As we have described above, according to this embodiment, the oscillating body 1 can be moved as a pendulum in an arbitrary direction with the ball screws 25 and 30. By synchronizing this motion with the vibration of the building 01 in the most suitable manner, the vibration of the building in any direction can be advantageously reduced.

Also, the mechanisms described in the second to fifth embodiments as well as in the seventh embodiment above can be used equally well in combination with this eighth embodiment.

Because the oscillating body, held so as to move in horizontal directions, is driven in two perpendicular directions by ball screws which are powered by motors, the oscillating body can move in any direction, and building vibrations in any horizontal direction can be reduced effectively.

Referring to FIGS. 11 to 14, we shall describe a ninth embodiment of the present invention.

Numeral 51 indicates an outer frame comprising an upper frame 51a and a rectangular pillar 51b. From the upper frame 51a of the outer frame 51, the oscillating body 53 with a rectangular horizontal section is suspended by four wires 56. The center portion of the upper side of the oscillating body 53 and the upper frame 51a of the outer frame are connected to each other by way of the rod 52. The upper and lower ends of the rod 52 are connected to the upper frame 51a of the outer frame and to the upper side of the oscillating body 53, respectively, by way of joints 57b. These joints which do not restrict the motion and rotation of the oscillating body 53 in any direction and do not support the weight of the oscillating body 53. Four sets in total of the shock absorbers 54 as damping elements and the springs 55 are disposed horizontally in two perpendicular directions. Both ends of each shock absorber 54 and each spring 55 are connected to the rod 52 and the pillar 51b of the outer frame through joints 58a, 58b, respectively. Also, of the springs 55, the two sets of the springs 55a, 55b arranged perpendicularly to each other can be adjusted independently of each other, so that they can correspond to the different natural frequency of the respective direction.

Figure 14:
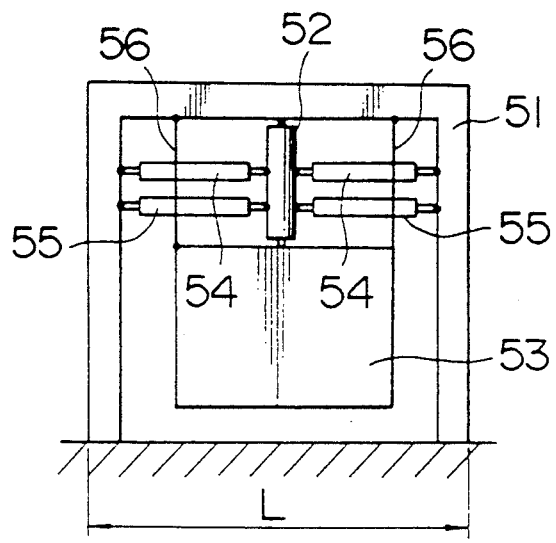
FIG. 14 shows the effect of this embodiment on the occupied space.
Figure 15:
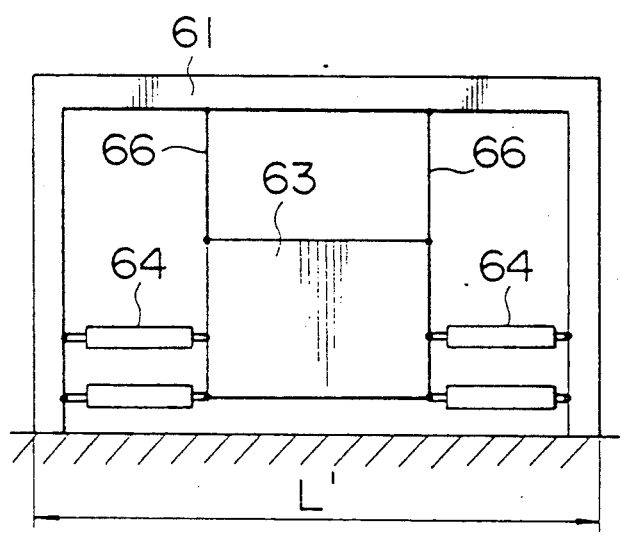
FIG. 15 shows a conventional pendulum type dynamic damper.

In the embodiment of the present invention described above, because the shock absorbers 54 and the springs 55 are attached to the rod 52 which is connected to the center of the oscillating body 53 while shock absorbers 54 are attached to the side of the oscillating body in the conventional pendulum type dynamic damper, the occupied area can be reduced. For comparison, the length L of the outer frame of this embodiment and the length L' of the outer frame of the conventional pendulum type dynamic damper are shown in FIGS. 14 and 15.

Figure 13:
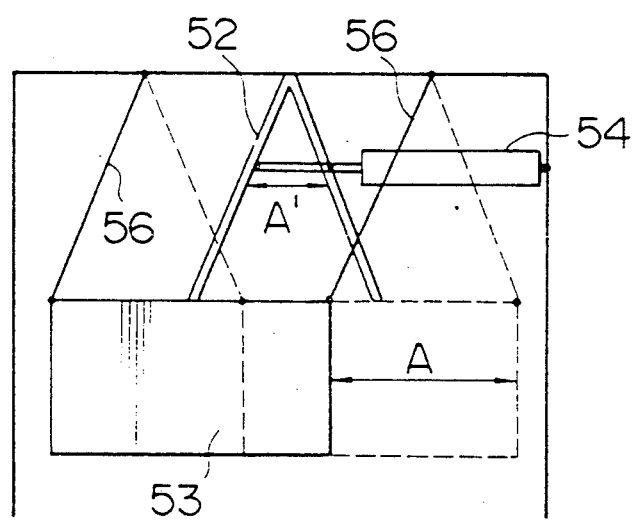

Also, in this embodiment, because the rod 52 does not restrict the motion of the oscillating body 53, and connects the oscillating body 53 and the upper frame 51a of the outer frame without supporting the weight of the oscillating body 53, the damping effects by the shock absorbers 54 and the springs 55 can be effectively achieved. Further, because as shown in FIG. 13, the total displacement (twice the amplitude) A' of oscillation for the shock absorbers 54 and the springs 55 remains small compared to the total displacement A of the oscillating body 53, the required strokes of the shock absorbers 54 and the springs 55 can be smaller, and the design of these would be easier.

In addition, according to this embodiment, by changing the stiffness of the springs 55 or changing the stiffness of the two sets of springs 55a, 55b arranged perpendicularly to each other independently, it is possible to adapt to an object of a different natural frequency or to an object having different natural frequencies with directionality.

Furthermore, the oscillating body 53 in this embodiment does not rotate like an inverted pendulum and moves in a more or less linear fashion. Thus it is easier to adapt to the dynamic control of the oscillating body 53 in a horizontal plane using active dynamic dampers or the like.

Also, while in the above-described embodiment, four sets of shock absorbers and springs are arranged in two perpendicular directions, other arrangements of springs and shock absorbers are possible within the scope of the present invention. For example, only two sets of shock absorbers and springs can be arranged in one direction, facing each other.

Because the oscillating body suspended from the outer frame is connected to the upper frame of the outer frame by the rod without the rod's supporting the weight of the oscillating body and without restricting the motion of the oscillating body, and because the damping elements and the springs are disposed horizontally to connect the rod and the outer frame, the present invention achieves the following effects.

(1) The area occupied by the dynamic damper can be reduced.

(2) The strokes of the damping elements and the springs can be reduced, making the designing and the manufacture of a dynamic damper easier.

(3) By changing the stiffness of the springs, the dynamic damper of the present invention can be adapted to objects with different natural frequencies.

(4) The oscillating body does not rotate, and the dynamic control of the motion of the oscillating body becomes easily possible in a horizontal plane.

While specific embodiments of the invention have been shown and described in detail to illustrate the application of the principles of the invention, it will be understood that the invention may be embodied otherwise without departing from such principles.

We claim:

1. A dynamic damper which comprises an oscillating body which is held to move horizontally with respect to a building whose vibration is to be reduced, a plurality of ball screws which are arranged perpendicularly to each other with a height difference among them and which each have a screw shaft whose ends are rotatably mounted onto the building and a nut portion engaging with said screw shaft so as to convert a rotational motion of the screw shaft to a translational motion, and a motor for turning the ball screws so as to reciprocate the oscillating body according to the period of vibration of the building.

2. A dynamic damper which comprises an oscillating body which is held so as to move horizontally with respect to a building whose vibration is to be reduced, a first two sets of screw shafts and nuts which are arranged in parallel with each other and horizontally under the oscillating body, each screw shaft being fixed at each end to the building, each nut being connected to the oscillating body so that the nuts can be rotated by a first motor and move the oscillating body in a first direction along which the screw shaft extends, and a second two sets of screw shafts and nuts which are arranged horizontally and perpendicularly to the first two sets of screw shafts, and the screw shafts of the second two sets being connected to the building and rotated by a second motor, and the nuts of the second two sets being connected to the oscillating body and moving the oscillating body in a second direction which is perpendicular to the first direction.

3. A dynamic damper for a structure, the damper comprising:
an oscillating body;
support means for vertically supporting said oscillating body on the structure and for substantially unrestricting substantially horizontal movement of said oscillating body;
a first screw shaft positioned in a substantially horizontal first direction and rotatably connected to the structure;
a first nut threadably engaged with said first screw, said first nut rigidly connected to said oscillating body in said first direction and slidably connected to said oscillating body in a second direction, said second direction being substantially horizontal and substantially perpendicular to said first direction;
a second screw shaft positioned in substantially said second direction and rotatably connected to the structure;
a second nut threadably engaged with said second screw shaft, said second nut rigidly connected to said oscillating body in said second direction and slidably connected to said oscillating body in said first direction;
first motor means for rotating said first shaft and moving said first nut and said oscillating body in substantially said first direction;
second motor means for rotating said second shaft and moving said second nut and said oscillating body in substantially said second direction; and
control means for sensing movement of the structure and controlling said first and second motors to reduce said movement of the structure.

* * * * *